United States Patent [19]

Gozlan

[11] 4,246,438

[45] Jan. 20, 1981

[54] SPACERS

[75] Inventor: Gilles R. Gozlan, Chaumont en Vexin, France

[73] Assignee: Raychem Corporation, Menlo Park, Calif.

[21] Appl. No.: 943,396

[22] Filed: Sep. 18, 1978

[30] Foreign Application Priority Data

Sep. 21, 1977 [GB] United Kingdom ............... 39290/77

[51] Int. Cl.³ ............................................. H02G 15/18

[52] U.S. Cl. ..................................... 174/88 C; 29/868; 174/DIG. 8

[58] Field of Search ................. 174/84 R, 88 R, 88 C, 174/DIG. 8; 29/628; 339/DIG. 1; 403/273, 28

[56] References Cited

U.S. PATENT DOCUMENTS 4,025,717 5/1977 Whittingham ..................... 174/88 C 4,144,404 3/1979 DeGroef et al. .................. 174/88 C

*Primary Examiner*—Roy N. Envall, Jr.

*Attorney, Agent, or Firm*—Lyon & Lyon

[57] ABSTRACT

In a method of connecting, for example, two coaxial cables, an electrical connection between the outer cable conductors is made by means comprising a hollow dimensionally-recoverable member, solder, and an electrically conductive deformable member at least a part of which is deformed by recovery of the recoverable member, and the impedance of the electrical connection between the cables and the inner dimensions of the electrical connection between the outer conductors are controlled by a spacer positioned adjacent to the electrical connection between the inner conductors. A connector and connector kit incorporating one or more spacers, as appropriate, are also described.

36 Claims, 19 Drawing Figures

SPACERS

The present invention relates to the electrical connection of two bodies each of which comprises an inner conductor and an outer conductor, and to a connector, connector kit and spacer suitable for this purpose.

British Specification No. 1,470,049 describes a connector for electrically connecting two electrically conductive bodies each having an inner conductor and an outer conductor, which connector comprises means for making an electrical connection between the inner conductors and means for making an electrical connection between the outer conductors, the means for making an electrical connection between the outer conductors comprising a hollow heat-recoverable member having two open ends, a quantity of solder positioned within the direction of recovery of the heat-recoverable member and a deformable member (as defined) positioned within the direction of recovery of the heat-recoverable member, the deformable member comprising electrically conductive material and being infusible at the temperature to which, in use, the connector is heated to cause the heat-recoverable member to recover and the solder to fuse and being so positioned that at least a part thereof is deformed by the recovery of the heat-recoverable member.

The deformable member of Specification No. 1,470,049 is such that, at the temperature to which the components are heated to cause the heat-recoverable member to recover and the solder to fuse, it can be deformed by the force exerted by the heat-recoverable member. A preferred example of a deformable member in Specification No. 1,470,049 is braid, more especially a sleeve (or tube) of braid.

The connector of Specification No. 1,470,049 may also comprise one or more spacers of an electrically insulating material for maintaining the electrical connection between the outer conductors at a predetermined distance from the electrical connection between the inner conductors. The spacers may be discs or caps of electrically insulating material. Moreover, the connector may also comprise means for controlling the dimensions of the splice in the outer conductors, the means preferably comprising a member (referred to in Specification No. 1,470,049 as a substantially undeformable member) which is positioned in the direction of recovery of the heat-recoverable member and is substantially undeformable by the force exerted by the heat-recoverable member when the means for joining the outer conductors is heated to cause the heat-recoverable member to recover and the solder to fuse, the substantially undeformable member being positioned substantially to prevent recovery of part of the heat-recoverable member and/or substantially to prevent deformation by the heat-recoverable member of part of the deformable member.

Specification No. 1,470,049 also describes a method of electrically connecting two electrically conductive bodies each of which comprises an inner conductor and an outer conductor, which method comprises electrically connecting the inner conductors, and making an electrical connection between the outer conductors by means comprising an electrically conductive deformable member (as defined), a hollow electrically insulating heat-recoverable member having two open ends, and a quantity of solder, the deformable member, the solder and the bodies being positioned in the direction of recovery of the heat-recoverable member, the deformable member being infusible at the temperature to which the connection is heated to cause the heat-recoverable member to recover and the solder to fuse and being so positioned that, at least a part thereof is deformed by the recovery of the heat-recoverable member, the heat-recoverable member being recovered to deform at least a part of the deformable member.

When in practice a splice is made using the connector described above which comprises spacers and a substantially undeformable member, the objects (for example coaxial cables) to be spliced are stripped to expose a length of inner conductor, a length of dielectric, and a length of outer conductor, the substantially undeformable member, the heat-recoverable member, deformable member and solder are slipped over one of the objects, spacers are installed on the inner conductors or on the ends of the inner conductor connecting means, the electrical connection is made between the inner conductors, the substantially undeformable member, heat-recoverable member, deformable member and solder are slipped over the spacers, and heat is applied to cause the heat-recoverable member to recover and the solder to fuse, whereby the heat-recoverable member deforms the ends of the deformable member into contact with the outer conductors to be joined, the solder ensuring that a good electrical connection is made between the deformable member and the outer conductors.

Connectors of the type described above have proved extremely useful in practice. In these connectors, however, the substantially undeformable member used for controlling the dimensions of the splice in the outer conductors is not positioned in a fixed location relative to the electrical connection between the inner conductors. Thus the substantially undeformable member is axially movable relative to the spacers, so that care must be taken in positioning the substantially undeformable member on the spacers; incorrect positioning could result in a less good impedance match. Moreover, the substantially undeformable member is in practice associated, before installation of the connector, with the heat-recoverable member, deformable member and quantity of solder used for connecting the outer conductors; in other words, the substantially undeformable member (which may be, for example, an elongate hollow member having two open ends and having dimensions such that it can receive the end of at least one of the bodies to be connected without the necessity of stripping from the latter any insulating layers that may be present on the outer conductors) forms part of the means for making the electrical connection between the outer conductors. If therefore such a connector is to be used, for example, for making an impedance-matched splice between two coaxial cables, the means for connecting the outer conductors must be chosen having due regard to the impedance of the cables to be spliced as the impedance of the splice will, for given dimensions of the inner conductor splice, be dependent primarily on the internal dimensions of the splice between the outer conductors; a different connecting means will generally be required for each different cable size.

SUMMARY OF THE INVENTION

The present invention provides a method of electrically connecting two electrically conductive bodies each of which comprises an inner conductor and an outer conductor separated by a dielectric which method comprises electrically connecting the inner conductors, positioning a spacer adjacent to the electrical connection between the inner conductors, and making an electrical connection between the outer conductors by means comprising a hollow dimensionally-recoverable member having two open ends, a quantity of solder and an electrically conductive deformable member, the quantity of solder and the deformable member being positioned in the direction of recovery of the dimensionally-recoverable member and the deformable member being infusible at the temperature to which the components are heated to cause the dimensionally-recoverable member to recover and the solder to fuse, being such that, at that temperature, it can be deformed by the force exerted by the dimensionally-recoverable member, and being so positioned that at least a part thereof is deformed by the recovery of said member, the dimensionally-recoverable member being recovered to deform at least a part of the deformable member, the impedance of the electrical connection between the two bodies, and the inner dimensions of the electrical connection between the outer conductors, being controlled by the spacer.

The present invention also provides a connector suitable for electrically connecting two electrically conductive bodies each of which comprises an inner conductor and an outer conductor separated by a dielectric, which connector comprises means for making an electrical connection between the inner conductors, means for making an electrical connection between the outer conductors, the means for making an electrical connection between the outer conductors comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature it can be deformed by the force exerted by the dimensionally-recoverable member, and being so positioned that at least a part thereof is deformed by the recovery of said member, and an electrically insulating spacer for receiving and at least partially surrounding the electrical connection between the inner conductors and for spacing the electrical connection between the outer conductors from the electrical connection between the inner conductors, the spacer being infusible at the temperature to which, in use, the means for connecting the outer conductors is heated to cause the dimensionally-recoverable member to recover and the solder to fuse and being substantially undeformable by the force exerted by the dimensionally-recoverable member when the means for connecting the outer conductors is heated to cause said member to recover and the solder to fuse, the spacer being such as to limit the deformation of the deformable member by the dimensionally-recoverable member, whereby the electrical connection between the outer conductors has predetermined inner dimensions, and such as to control the impedance of the electrical connection between the electrically conductive bodies.

The invention also provides a connector kit for electrically connecting two electrically conductive bodies each comprising an inner conductor and an outer conductor separated by a dielectric, which comprises means for making an electrical connection between the inner conductors, means, as specified above in relation to the connector of the invention, for making an electrical connection between the outer conductors, and a plurality of spacers as specified above in relation to the connector of the invention, each spacer having such a shape and impedance as to be suitable for use with a different pair of bodies to be joined.

The invention also provides a spacer of electrically insulating material for use in electrically connecting two electrically conductive bodies each comprising an inner conductor and an outer conductor separated by a dielectric using means for making an electrical connection between the inner conductors and means, as specified above in relation to the connector of the invention, for making an electrical connection between the outer conductors, which spacer is capable of receiving, and of at least partially surrounding, the electrical connection between the inner conductors and of spacing the electrical connection between the outer conductors from the electrical connection between the inner conductors, is infusible at the temperature to which, in use, the means for connecting the outer conductors is heated to cause the dimensionally-recoverable member to recover and the solder to fuse, and is substantially undeformable by the force exerted by the dimensionally-recoverable member when the means for connecting the outer conductors is heated to cause the dimensionally-recoverable member to recover and the solder to fuse, the spacer being capable of limiting the deformation of the deformable member by the dimensionally-recoverable member, whereby the electrical connection between the outer conductors has predetermined inner dimensions, and of controlling the impedance of the electrical connection between the electrically conductive bodies.

The dimensionally-recoverable member has preferably been changed from an original heat-stable configuration to a dimensionally heat-unstable configuration, in which case it tends to move in the direction of the original configuration on the application of heat alone. As is made clear in U.S. Pat. No. 2,027,962, the disclosure of which is incorporated herein by reference, the original dimensionally heat-stable form may be a transient form in a continuous process in which, for example, an extruded tube is expanded, whilst hot, to a dimensionally heat-unstable form, but in other applications a preformed dimensionally heat-stable article is deformed to a dimensionally heat-unstable form in a separate stage. The dimensionally-recoverable member is preferably independently dimensionally heat-unstable, that is, it preferably does not require the presence of another member to hold it in a dimensionally heat-unstable state. Examples of materials which may be used for forming independently dimensionally heat-unstable members are given in, for example British Specification No. 1,470,049; U.S. Pat. No. 4,144,404, formerly U.S. Ser. No. 715,402, a continuation-in-part of U.S. Ser. No. 607,249, filed Aug. 25, 1975, now abandoned, which was a continuation of U.S. Ser. No. 452,128, filed Mar. 18, 1974, also now abandoned, and U.S. Pat. Nos. 2,027,962, 3,086,242 and 3,721,749, the disclosures of which specifications and applications are incorporated herein by reference. Alternatively, however, the dimensionally-recoverable member may be, for example, an elastomeric or resiliently-recoverable member which is held in a dimensionally heat-unstable state by another member, for example by the deformable member and, if desired, the solder (for example by solder-impregnated braid), or by any other member (for example those disclosed in British Specifications Nos. 1,440,524 and 1,434,719 and U.S. Ser. No. 285,567 filed Sept. 1, 1972, now U.S. Pat. No. 4,035,534 and U.S. Ser. No. 662,856, a continuation of 393,661 filed Aug. 31, 1973, now abandoned the disclosures of which specifications and applications are incorporated by reference herein) which, upon heating, weakens and thus allows the elastomeric member to recover. For convenience, the dimensionally-recoverable member will from now on in this description be referred to by the general terms "heat-recoverable member" or "heat-shrinkable member".

The essence of the present invention is to provide a spacer, generally made from a dielectric material, which is positioned around the splice between the inner conductors and, preferably, extends along substantially the whole length thereof, and in doing so fulfils two functions. Firstly, as a spacer, it ensures that the deformation of the deformable member by the recoverable member is limited to a predetermined extent. Secondly, by its dielectric nature and its shape and size, it controls the impedance of the electrical connection. In this latter respect it occupies a substantial proportion of the space which would normally be occupied by the dielectric of the conductors, for example the cables, being connected and, especially, occupies a major proportion of said space in the vicinity of the splice itself. In addition, because it is located around and, preferably, along the length of, the splice it may be placed in position after the splice has been effected.

It will be appreciated therefore that the spacer, with these dual functions, is different from the non-deformable members and spacers described, and shown, in U.S. Pat. No. 1,470,049, for example in FIG. 15 thereof, which do not fall within the scope of the present invention.

The shape of the spacer, and the material(s) from which it is made, are preferably such that the impedance of the overall connection is as close as possible to that of the objects (which may be, for example, coaxial cables) being joined.

As indicated above, because the spacer both receives the connection in the inner conductors and has an outer surface shaped to limit the deformation of the deformable member through which the electrical connection between the outer conductors is made, the spacer can determine both the dielectric constant and the geometry in the splice area and can thus control the impedance of the splice. A single inner conductor connecting means and single outer conductor connecting means can therefore be used, merely by selecting an appropriately designed spacer, for a variety of cable sizes and cable impedances. Thus, when using the connector kit referred to above, the spacer appropriate to the objects to be joined may be selected, and the other spacer(s) can be thrown away. The provision of a range of different spacers of, for example, a plastics material is, of course, very much less expensive than the provision of a plurality of outer conductor connecting means of different sizes.

A further advantage of the fact that, in accordance with the invention, the spacer can control the impedance of the splice is that, by using for the spacer a material having a high dielectric constant and/or by appropriate design of the spacer (see below) the overall dimensions of the splice may be significantly smaller than those of the splices made using the above-described connector of Specification No. 1,470,049.

All kinds of coaxial and shielded cables can be spliced by means of the technique made possible by the present invention. Thus, for example, the technique can be used with flexible cables, rigid cables, cables with an air dielectric, and cables with a solid dielectric, and may be used for joining each of these types of cables to a similar cable or to a cable of a different type. For instance, a coaxial cable with a solid dielectric and a rigid conductor to which it is not possible to make a crimp connection can readily be spliced by the technique made possible by the present invention, the latter technique being considerably simpler and cheaper than the use of the multipiece contact type connector traditionally used for splicing coaxial cables. The technique may also be used for splicing one coaxial cable to two others (Y-splicing).

Advantageously, the spacer can receive, and at least partially surround, substantially the whole length of the electrical connection between the inner conductors. The latter arrangement means that a significant part of the space between the electrical connection between the inner conductors and the electrical connection between the outer conductors is occupied by the spacer for substantially the whole length of the electrical connection between the outer conductors. The dielectric contact of the space is thus controlled by the shape and dielectric constant of the spacer so that, for example, the inner dimensions of the electrical connection between the outer conductors can be reduced significantly compared with the dimensions required to give a good impedance match when using the disc or cap-shaped spacers referred to in Specification No. 1,470,049.

The extent to which the spacer surrounds the electrical connection between the inner conductors depends on the exact electrical characteristics required from the splice. Thus in some circumstances, the spacer may have a plurality of longitudinal slots therein such that only about 50% of the outer surface of the electrical connection between the inner conductors is surrounded by the spacer, but preferably the spacer is shaped substantially completely to surround the said outer surface, although (see below) a narrow longitudinal slit may be provided in the spacer to enable a one-piece spacer to be installed round a completed splice between the inner conductors.

In order to space the electrical connection between the outer conductors from the electrical connection between the inner conductors, at least part of the spacer must of course be such that it can contact the electrical connection between the inner conductors and/or can contact the inner conductors in the immediate vicinity of the splice. As the spacer of the invention performs not only a spacing function but also controls the impedance of the completed splice, substantially the whole length of the spacer is advantageously in contact with, or closely adjacent to, the inner conductors or the electrical connection between them. Advantageously, the spacer is in contact with, or closely adjacent to, substantially the whole length of the electrical connection between the inner conductors, and, preferably, is also in contact with substantially the whole length of any portion(s) of the inner conductors that may be exposed in the region of the connection between the inner conductors. In the preferred case where the spacer can receive substantially the whole length of the electrical connection in the inner conductors, this means that substantially the whole of the said electrical connection is closely surrounded by the spacer, which may be contrasted with the situation resulting from the use of the disc or cap-shaped spacers described in Specification No. 1,470,049.

The spacer of the invention may comprise one or more parts. Where the spacer comprises more than one part these parts may be preassembled such that the spacer can be installed as a single unit or the spacer may be assembled around the electrical connection between the inner conductors, for example, by fitting together two half shells or by positioning on the electrical connection between the inner conductors a plurality of spacer elements which together make up the spacer. Thus, for example, a plurality of spacer elements each having a length shorter than the length of the electrical connection between the inner conductors may be used, each element either being axially spaced from, or in contact with, the adjacent spacer(s).

The exact shape of the spacer will of course depend on the dimensions and impedance of the objects to be spliced. For splicing two cables having identical dimensions and impedances, the spacer may for example, have a generally cylindrical opening therethrough for receiving the splice in the inner conductors and have an outer configuration such that the centre portion of the deformable member, after deformation around the spacer, is also generally cylindrical and coaxial with the splice in the outer conductors. For special purposes, however, spacers of other shapes may be required; for example a spacer capable of imparting a conical inner surface to the deformable member may be required for splicing cables of different diameters, while a special shape may also be required for Y-splicing.

A specific example of a case where a particular design of the spacer may be required is when the spacer is intended for use in the connection of low temperature dielectric cables. The dielectric of such cables is liable to be damaged by the heat required to form the electrical connection between the outer conductors, and it is thus desirable to insert a heat barrier between each outer conductor and the dielectric. The insertion of such a barrier produces a local mismatch, but in accordance with the present invention this factor may be taken into consideration in choosing the shape of the spacer so that a heat barrier may be used without significantly detracting from the impedance match.

When making a splice using the connector of the invention, the spacer may be installed around the splice in the inner conductors after the latter has been made. In order to make this possible, the spacer may have a longitudinal slit therein, such that it can be snapped around the splice in the inner conductors. Alternately, for example, the spacer could be in the form of two identical half-shells provided with a positioning and locking mechanism. It is particularly advantageous if the spacer has such a configuration as to be extrudable.

The material of which the spacer is used will, of course, affect the impedance of the splice. Examples of materials that may be used are polytetrafluoroethylene and crosslinked polymeric materials, for example crosslinked polyethylene and, where a higher dielectric constant is required, crosslinked polyvinylidene fluoride. The dielectric constant of any of these materials may be modified if desired by, for example, the incorporation in them of suitable substances, for example fibre glass. Ceramic materials may be used for the spacer if a very high dielectric constant is required. As indicated above, the spacer may be in one or more parts and, in the latter case, the parts may or may not have the same dielectric constant. Thus, for example, a multi-piece spacer with pieces of different dielectric constants may be required in the case of "Y"-splicing, where unequal and predetermined amounts of power are to be carried by each of the branches of the "Y". In addition to selecting material(s) of appropriate dielectric constant(s) for the spacer, the material may also be selected to absorb radio frequency waves such that the spacer also acts as an attenuator.

Any of the deformable members described in Specification No. 1,470,049 or U.S. Ser. Nos. 452,128, 607,249 or 715,402 previously incorporated by reference may be used in accordance with the present invention. Preferably, however, the deformable member comprises a tube of braid which can be expanded and contracted in a direction substantially normal to its longitudinal axis, and the braid is advantageously impregnated with the solder. An additional quantity of solder (for example high melting solder) may also be used, as described in Specification No. 1,470,049 or U.S. Ser. Nos. 452,128, 607,249 or 715,402 previously incorporated by reference. The deformable member is advantageously retained in the heat-recoverable member by partial recovery of the latter into contact with the deformable member.

Any suitable means, for example the means described in Specification No. 1,470,049 or U.S. Ser. Nos. 452,128, 607,249 or 715,402 previously incorporated by reference can be used for making an electrical connection between the inner conductors. Thus, for example, a contact type splice may be used, or a heat-shrinkable sleeve containing a quantity of solder. Where, however, it is important to obtain a mechanically strong splice and/or a close impedance match the inner conductors are preferably connected by making an electrical connection between each inner conductor and an elongate electrically conductive member. Such a connection to an elongate electrically conductive member may be made, for example, by crimping or soldering, and details of suitable methods are set out in Specification No. 1,470,049 or U.S. Ser. Nos. 452,128, 607,249 or 715,402 previously incorporated by reference.

A number of embodiments of the invention will now be described, by way of example only, with reference to the accompanying drawings, in which.

Figure 1:
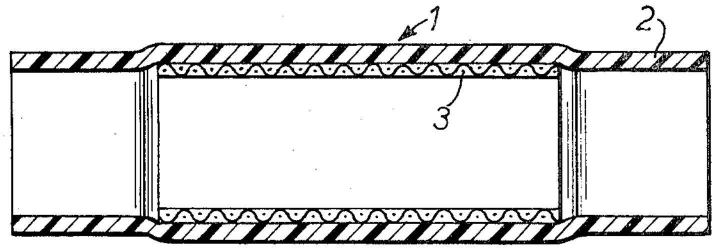
FIG. 1 is a longitudinal section through an assembly that may be used for joining the outer conductors of for example two coaxial cables.

Referring now to the drawings, FIG. 1 shows an assembly 1 that may be used for joining the outer conductors of two coaxial cables. The assembly 1 comprises a heat-shrinkable sleeve 2 of electrically insulating material, for example crosslinked polyvinylidene fluoride. Other examples of materials from which sleeve 2, and the other heat-recoverable sleeves mentioned in this specification, may be made are given in Specification No. 1,470,049. The sleeve 2 is preferably transparent to permit inspection of the splice. A tube 3 of solder-impregnated metallic braid, for example copper braid, is positioned within heat-shrinkable sleeve 2 and may be held firmly in position in the sleeve 2 by partial recovery of the sleeve 2 onto it. The braid may be pre-fluxed. The heat-shrinkable sleeve 2 extends beyond the ends of the tube 3.

Figure 2:
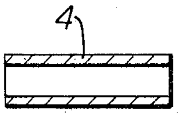
FIGS. 2 to 4 show, in longitudinal section, various devices that may be used for joining two inner conductors of for example two coaxial cables.
Figure 3:
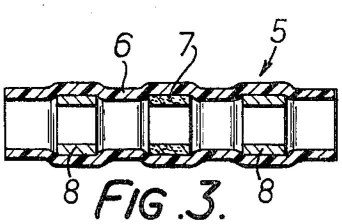
Figure 4:
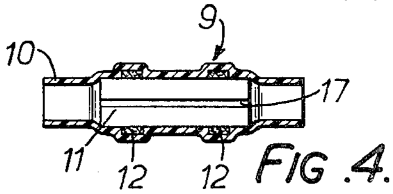

FIGS. 2 to 4 are examples of devices that may be used for joining the inner conductors. FIG. 2 shows a crimpable tube 4 for crimping onto the inner conductors, while FIG. 3 shows a device 5 comprising a heat-shrinkable sleeve 6 of insulating material, the sleeve containing a ring 7 of solder and flux and two rings 8 of a fusible electrically insulating material, each ring 8 being positioned between the ring 7 of solder and a respective open end of the heat-shrinkable sleeve 6. When the device 5 is heated during installation thereof the rings 8 flow and form dams to prevent the escape of solder. The device 9 shown in FIG. 4 comprises a heat-shrinkable sleeve 10 of electrically insulating material which surrounds a metal tube 11 (made, for example, of brass or copper) having a longitudinal slit 17 therein. Two rings 12 of solder and flux are positioned between the sleeve 10 and the tube 11 (see Specification No. 1,470,049).

Figure 5:
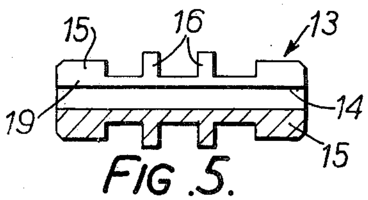
FIG. 5 is a longitudinal section through a spacer constructed in accordance with the invention.

FIG. 5 shows a spacer 13 in accordance with the invention which may be used, for example, in conjunction with the assembly of FIG. 1 and any of the devices in FIGS. 2 to 4. The spacer 13 has a generally cylindrical body portion 19 having a cylindrical central passageway 14 therethrough, the dimensions of the passageway being such that the spacer fits closely around the electrical connection in the inner conductors. The passageway is coaxial with the body portion. Collars 15 and 16 extend radially outward from, and are formed integrally with, the body portion 19, the collars 15, which are situated at the ends of the body portion, having a smaller radius but a greater axial extent than the collars 16, which are positioned intermediate the collars 15. The spacer, which is a one-piece spacer, is provided with a longitudinal slit 18 (see FIG. 6) so that it can be installed over the splice in the inner conductors. Alternatively, the spacer could be made in the form of two half shells.

Figure 6:
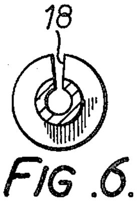
FIG. 6 is a cross-section of the spacer shown in FIG. 5.

A connector or connector kit in accordance with the invention includes outer conductor connecting means (for example that shown in FIG. 1), inner conductor connecting means (for example any of those shown in FIGS. 2 to 4) and one or more spacers (for example spacers having the general shape shown in FIGS. 5 and 6). The outer conductor connecting means should have an extended diameter which is greater than the overall diameter of the cable to be spliced and greater than the diameter of the spacer; the diameter after complete recover should be less than the outer diameter of the outer conductors of the cables to be spliced. When making a splice, the outer conductor connecting means is slipped over one of the objects to be joined, a splice is made in the inner conductors, the spacer is installed over the splice so made, the outer conductor connecting means is positioned round the spacer, and heat is applied to cause the outer conductor connecting means to shrink into contact with the spacer and with the stripped ends of the outer conductors.

Figure 7:
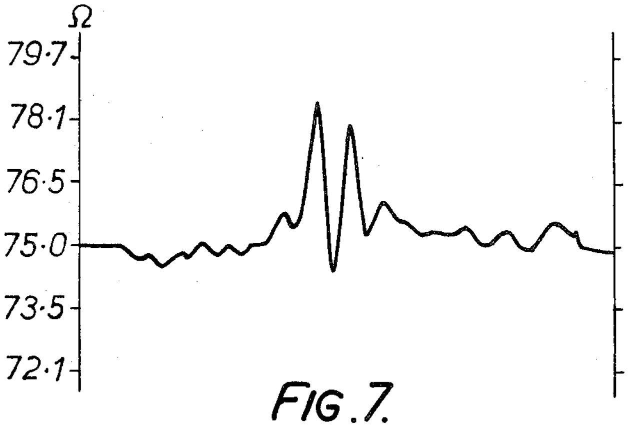
FIG. 7 is a time domain reflectometer display of a splice made using the components shown in FIGS. 1, 4 and 5.

A time domain reflectometer display of a splice between two 75Ω coaxial cables made in the manner indicated above using the components of FIGS. 1, 4 and 5 is shown in FIG. 7. In the splice in question, the tensile strength of the splice in the inner conductors was greater than that of the inner conductors, while the tensile strength of the outer conductor splice was greater than or equal to the tensile strength of the outer conductors. The splice had a voltage standing wave ratio of less than or equal to 1.05 measured with a time domain reflectometer at 150 ps (frequency range 2.3 GHz), a dielectric withstanding voltage measured by Method 301 of MIL-STD-202D of greater than 5 KV rms (AC) and a voltage drop measured in accordance with paragraph 4.8.1 of MIL-T-7928F of 0.33 m Ω for the inner conductor splice (less than the voltage drop of an equivalent length of inner conductor alone) and of 0.48 mΩ for the outer conductor splice (equal to the voltage drop of an equivalent length of outer conductor alone). It can thus be seen that a splice with very acceptable characteristics was obtained.

Figure 8:
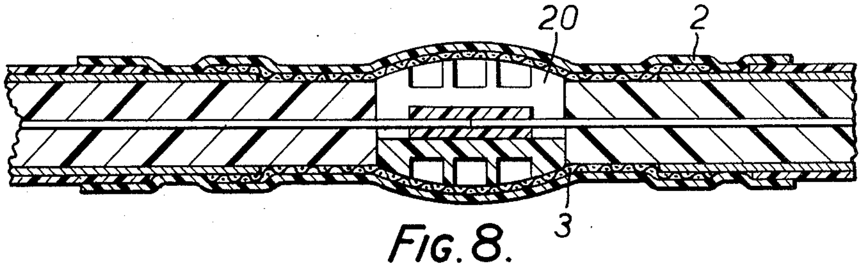
FIG. 8 is a cross-section through a connection made between a pair of similarly sized coaxial cables.
Figure 9:
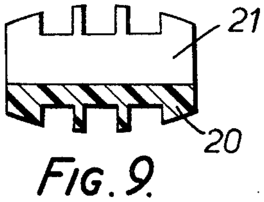
FIG. 9 is a longitudinal cross-section through the spacer used in making the connection of FIG. 8.
Figure 10:
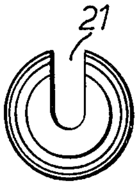
FIG. 10 is an end view of the spacer shown in FIG. 9.

In FIG. 8 there is shown a connection made using a spacer 20 which is of a slightly different shape from the spacer shown in FIG. 5. The spacer 20, which is shown in more detail in FIGS. 9 and 10, is provided with a longitudinal slot 21 for easy location about the splice formed between the inner conductors and is contoured to give the correct impedance to the connection. In this case the ends of the spacer 20 are tapered but, in general, the end will preferably be shaped as shown in FIG. 5 so as to provide a smooth contour from the end of a spacer to the dielectric between the inner and outer conductors of the cables.

Figure 11:
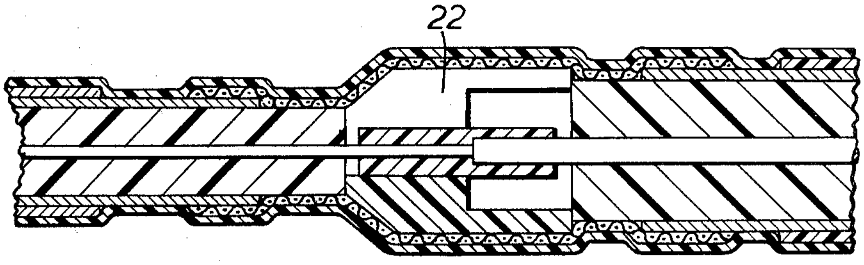
FIG. 11 shows a connection made between two coaxial cables of different thickness.
Figure 12:
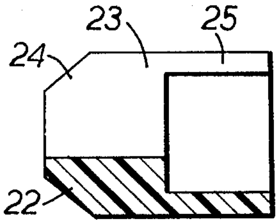
FIG. 12 is a longitudinal cross-section through the spacer used in FIG. 11.
Figure 13:
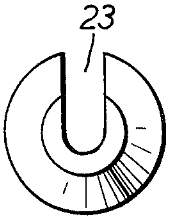
FIG. 13 is an end view of the spacer shown in FIG. 12.

FIG. 11 shows a further form of connection made in accordance with the present invention, but between two cables of different thickness. As is shown more clearly in FIGS. 12 and 13, the spacer 22 used in this case, which is again provided with a longitudinal slit 23, is so contoured that at one of its ends 24 it comes substantially into contact with the splice between the inner conductors whereas at the other end 25 it is spaced apart from the splice. It has been found that this contouring gives the most effective impedance control for this application, but, of course, in other cases it may be appropriate to provide a spacer which is in contact with the splice throughout its length and which, in certain applications, is more or less a solid cylinder (of for example crosslinked polyvinylidene fluoride or a ceramic material) which may be provided with a longitudinal slit to assist location or which may be made from two or more parts provided with grooves which cooperate together to form a central channel for location of the splice.

Figure 14:
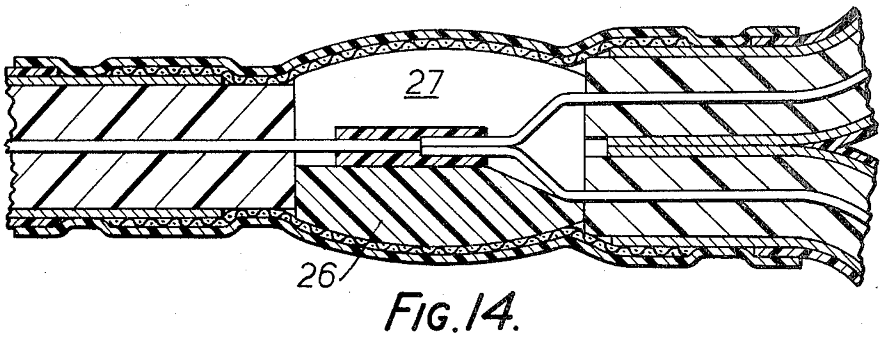
FIG. 14 shows another connection between coaxial cables.
Figure 15:
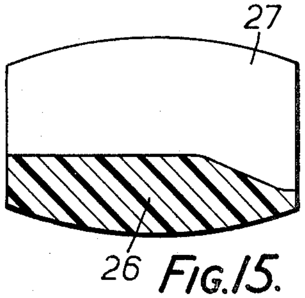
FIG. 15 is a longitudinal cross-section through the spacer used in the connection of FIG. 14.
Figure 16:
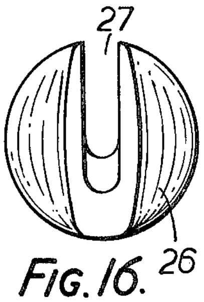
FIG. 16 is one end view of the spacer shown in FIG. 14.
Figure 17:
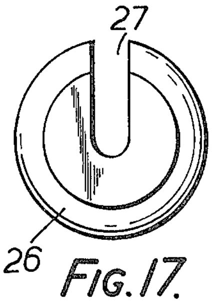
FIG. 17 is the other end view of the spacer shown in FIG. 14.
Figure 18:
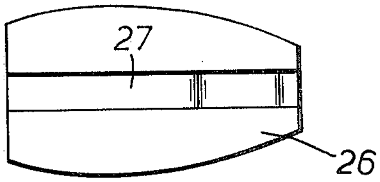
FIG. 18 is a top view of the spacer shown in FIG. 14.

In FIG. 14 there is shown the connection of one cable comprising a central conductor and an outer conductor separated by a dielectric to two other such cables. The splice effected is thus a Y-splice between the single conductor and the two conductors of the cables. As is shown more clearly in FIGS. 15 to 18, the spacer 26, provided with longitudinal slit 27, is contoured to accommodate the Y-splice and to provide the required impedance control.

Figure 19:
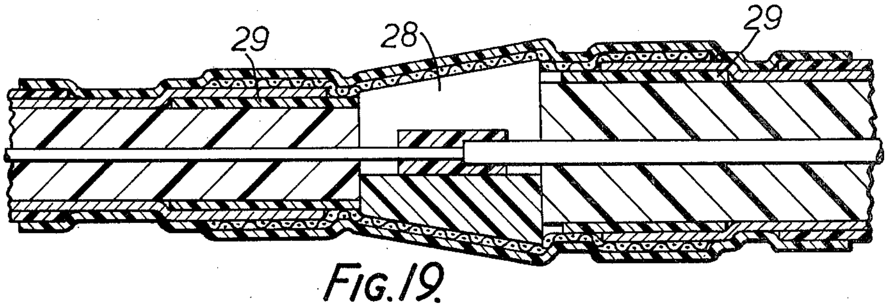
FIG. 19 shows yet another connection between a pair of differently sized coaxial cables.

Finally, in FIG. 19 there is shown yet another connection made in accordance with the present invention. In this embodiment the cables are of different size and, for this reason, the spacer 28 used is, in this instance, of truncated conical configuration. The connection is further characterized by the provision of a heat barrier 29 which is positioned between the outer conductor and the dielectric of each of the two cables so as to protect the dielectric against excessive heat during recovery. The heat barrier 29 is typically a sleeve of heat insulating material such as crosslinked, but non-expanded, polymer.

Other variations and designs falling within the scope of the present invention will be apparent to those skilled in the art.

I claim:

1. A method of electrically connecting two electrically conductive bodies each of which comprises an inner conductor and an outer conductor separated by a dielectric, which method comprises electrically connecting the inner conductors, positioning a spacer adjacent to the electrical connection between the inner conductors, and making an electrical connection between the outer conductors by means comprising a hollow dimensionally-recoverable member having two open ends, a quantity of solder and an electrically conductive deformable member, the quantity of solder and the deformable member being positioned in the direction of recovery of the dimensionally-recoverable member and the deformable member being infusible at the temperature to which the components are heated to cause the dimensionally-recoverable member to recover and the solder to fuse, being such that, at that temperature, it can be deformed by the force exerted by the dimensionally-recoverable member, and being so positioned that at least a part thereof is deformed by the recovery of said member, the dimensionally-recoverable member being recovered to deform at least a part of the deformable member, the impedance of the electrical connection between the two bodies, and the inner dimensions of the electrical connection between the outer conductors, being controlled by the spacer.

2. A method as claimed in claim 1, wherein the spacer occupies a substantial proportion of the space that would normally be occupied by the dielectric of the bodies.

3. A method as claimed in claim 1, wherein substantially the whole length of the spacer is in contact with the inner conductors or the electrical connection between them.

4. A method as claimed in claim 1, wherein the spacer is in contact with, or is closely adjacent to, substantially the whole length of the electrical connection between the inner conductors.

5. A method as claimed in claim 1, wherein at least one of the electrically conductive bodies comprises a coaxial cable.

6. A method as claimed in claim 1, wherein a heat barrier is positioned between the outer conductor and the dielectric of at least one of the electrically conductive bodies.

7. A method as claimed in claim 6, wherein the heat barrier comprises a sleeve of a crosslinked polymer.

8. A connector suitable for electrically connecting two electrically conductive bodies each of which comprises an inner conductor and an outer conductor separated by a dielectric which connector comprises means for making an electrical connection between the inner conductors, means for making an electrical connection between the outer conductors, the means for making an electrical connection between the outer conductors comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature, it can be deformed by the force exerted by the dimensionally-recoverable member, and being so positioned that at least part thereof is deformed by the recovery of said member, and an electrically insulating spacer for receiving and at least partially surrounding the electrical connection between the inner conductors and for spacing the electrical connection between the outer conductors from the electrical connection between the inner conductors, the spacer being infusible at the temperature to which, in use, the means for connecting the outer conductors is heated to cause the dimensionally-recoverable member to recover and the solder to fuse and being substantially undeformable by the force exerted by the dimensionally-recoverable member when the means for connecting the outer conductors is heated to cause said member to recover and the solder to fuse, the spacer being such as to limit the deformation of the deformable member by the dimensionally-recoverable member, whereby the electrical connection between the outer conductors has predetermined inner dimensions, and such as to control the impedance of the electrical connection between the electrically conductive bodies.

9. A connector as claimed in claim 8, wherein the spacer is capable of receiving, and of at least partially surrounding, substantially the whole length of the electrical connection between the inner conductors.

10. A connector as claimed in claim 9, wherein the spacer is capable of substantially completely surrounding the electrical connection between the inner conductors.

11. A connector as claimed in claim 8, wherein the spacer has a longitudinal slit therein to permit the spacer to be installed on the electrical connected between the inner conductors.

12. A connector as claimed in claim 8, wherein the spacer is such that, in use, substantially the whole length thereof is in contact with the inner conductors or the electrical connection between them.

13. A connector as claimed in claim 8, wherein the spacer is such that, in use, it is in contact with, or closely adjacent to, substantially the whole length of the electrical connection between the inner conductors.

14. A connector as claimed in claim 8, wherein the spacer is formed in one piece.

15. A connector as claimed in claim 8, wherein the spacer comprises a plurality of parts which can be assembled around the electrical connection between the inner conductors.

16. A connector as claimed in claim 8, wherein the spacer has a generally cylindrical longitudinal opening for receiving the electrical connection between the inner conductors and an outer configuration such that, in an assembly made using the connector, the centre portion of the inner surface of the electrical connection between the outer conductors is also generally cylindrical and is substantially coaxial with the electrical connection between the inner conductors.

17. A conductor as claimed in claim 8, wherein the spacer comprises a generally cylindrical hollow body portion having a plurality of annuli extending radially outward therefrom.

18. A connector as claimed in claim 8, wherein the spacer comprises polytetrafluoroethylene.

19. A connector as claimed in claim 8, wherein the spacer comprises a crosslinked polymeric material.

20. A connector as claimed in claim 19, wherein the spacer comprises crosslinked polyethylene or crosslinked polyvinylidene fluoride.

21. A connector as claimed in claim 18 or claim 19, wherein the spacer also comprises a material for modifying the dielectric constant of the polytetrafluoroethylene or the crosslinked polymeric material.

22. A connector as claimed in claim 8, wherein the spacer comprises a ceramic material.

23. A connector as claimed in claim 8, wherein the spacer comprises a material capable of absorbing radio frequency waves.

24. A connector as claimed in claim 8, wherein the deformable member comprises a braid.

25. A connector as claimed in claim 24, wherein the braid is impregnated with the solder.

26. A connector as claimed in claim 8, wherein the means for making the electrical connection between the inner conductors comprises an elongate electrically conductive member.

27. A connector as claimed in claim 8, wherein the means for making the electrical connection between the inner conductors comprises a heat-recoverable sleeve having a quantity of solder therein.

28. A connector kit for electrically connecting two electrically conductive bodies each comprising an inner conductor and an outer conductor separated by a dielectric, which comprises means for making an electrical connection between the inner conductors, means for making an electrical connection between the outer conductors, the means for making an electrical connection between the outer conductors comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature, it can be deformed by the force exerted by the dimensionally-recoverable member, and being so positioned that at least a part thereof is deformed by the recovery of said member, and a plurality of electrically insulating spacers each of which is capable of receiving and at least partially surrounding the electrical connection between the inner conductors and of spacing the electrical connection between the outer conductors from the electrical connection between the inner conductors, the spacers being infusible at the temperature to which, in use, the means for connecting the outer conductors is heated to cause the dimensionally-recoverable member to recover and the solder to fuse and being substantially undeformable by the force exerted by the dimensionally-recoverable member when the means for connecting the outer conductors is heated to cause said member to recover and the solder to fuse, each spacer being such as to limit the deformation of the deformable member by the dimensionally-recoverable member, whereby the electrical connection between the outer conductors has predetermined inner dimensions, and such as to control the impedance of the electrical connection between the electrically conductive bodies, each spacer having such a shape and impedance as to be suitable for use with a different pair of bodies to be joined.

29. A method as claimed in claim 1, wherein a connector is used which comprises means for making an electrical connection between the inner conductors, means for making an electrical connection between the outer conductors, the means for making an electrical connection between the outer conductors comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature, it can be deformed by the force exerted by the dimensionally-recoverable member, and being so positioned that at least a part thereof is deformed by the recovery of said member, and an electrically insulating spacer for receiving and at least partially surrounding the electrical connection between the inner conductors and for spacing the electrical connection between the outer conductors from the electrical connection between the inner conductors, the spacer being infusible at the temperature to which, in use, the means for connecting the outer conductors is heated to cause the dimensionally-recoverable member to recover and the solder to fuse and being substantially undeformable by the force exerted by the dimensionally-recoverable member when the means for connecting the outer conductors is heated to cause said member to recover and the solder to fuse, the spacer being such as to limit the deformation of the deformable member by the dimensionally-recoverable member, whereby the electrical connection between the outer conductors has predetermined inner dimensions, and such as to control the impedance of the electrical connection between the electrically conductive bodies.

30. A method as claimed in claim 1, wherein the outer conductors are electrically connected by means comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature, it can be deformed by the force exerted by the dimensionally-recoverable member, and being so positioned that at least a part thereof is deformed by the recovery of said member.

31. A method as claimed in claim 1, wherein the inner conductors are electrically connected by means comprising an elongate electrically conductive member and/or a heat-recoverable sleeve having a quantity of solder therein.

32. A method as claimed in claim 1, wherein an electrically insulating spacer is used, the spacer being capable of receiving and at least partially surrounding the electrical connection between the inner conductors and of spacing the electrical connection between the outer conductors from the electrical connection between the inner conductors, the spacer being infusible at the temperature to which, in use, the means for connecting the outer conductors is heated to cause the dimensionally-recoverable member to recover and the solder to fuse and being substantially undeformable by the force exerted by the dimensionally-recoverable member when the means for connecting the outer conductors is heated to cause said member to recover and the solder to fuse, the spacer being such as to limit the deformation of the deformable member by the dimensionally-recoverable member, whereby the electrical connection between the outer conductors has predetermined inner dimensions, and such as to control the impedance of the electrical connection between the electrically conductive bodies.

33. A method as claimed in claim 1, wherein a connector kit is used, the connector kit comprising means for making an electrical connection between the inner conductors, means for making an electrical connection between the outer conductors, the means for making an electrical connection between the outer conductors comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature, it can be deformed by the force exerted by the dimensionally-recoverable member, and being so positioned that at least a part thereof is deformed by the recovery of said member, and a plurality of electrically insulating spacers each of which is capable of receiving and at least partially surrounding the electrical connection between the inner conductors and of spacing the electrical connection between the outer conductors from the electrical connection between the inner conductors, the spacers being infusible at the temperature to which, in use, the means for connecting the outer conductors is heated to cause the dimensionally-recoverable member to recover and the solder to fuse and being substantially undeformable by the force exerted by the dimensionally-recoverable member when the means for connecting the outer conductors is heated to cause said member to recover and the solder to fuse, each spacer being such as to limit the deformation of the deformable member by the dimensionally-recoverable member, whereby the electrical connection between the outer conductors has predetermined inner dimensions, and such as to control the impedance of the electrical connection between the electrically conductive bodies, each spacer having such a shape and impedance as to be suitable for use with a different pair of bodies to be joined, the spacer appropriate to the bodies to be joined being selected.

34. An assembly whenever made by a method as claimed in claim 1.

35. An assembly as claimed in claim 34, wherein the electrically conductive bodies are coaxial cables of the same impedance as each other and the impedance of the connection is substantially equal to that of the cables.

36. A spacer of electrically insulating material for use in electrically connecting two electrically conductive bodies each comprising an inner conductor and an outer conductor separated by a dielectric using means for making an electrical connection between the inner conductors and means for making an electrical connection between the outer conductors, the means for making an electrical connection between the outer conductors comprising a hollow dimensionally-recoverable member having two open ends, a quantity of solder positioned in the direction of recovery of the dimensionally-recoverable member and an electrically conductive deformable member positioned in the direction of recovery of said member, the deformable member being infusible at the temperature to which, in use, the connector is heated to cause the dimensionally-recoverable member to recover and the solder to fuse, being such that, at that temperature, it can be deformed by the force exerted by the dimensionally-recoverable member, and being so positioned that at least a part thereof is deformed by recovery of said member, which spacer is capable of receiving, and of at least partially surrounding, the electrical connection between the inner conductors and of spacing the electrical connection between the outer conductors from the electrical connection between the inner conductors, is infusible at the temperature to which, in use, the means for connecting the outer conductors is heated to cause the solder to fuse, and is substantially undeformable by the force exerted by the dimensionally-recoverable member when the means for connecting the outer conductors is heated to cause the solder to fuse, the spacer being capable of limiting the deformation of the deformable member by the dimensionally-recoverable member, whereby the electrical connection between the outer conductors has predetermined inner dimensions, and of controlling the impedance of the electrical connection between the electrically conductive bodies.

* * * * *